United States Patent
Ramirez

(10) Patent No.: US 10,124,482 B2
(45) Date of Patent: Nov. 13, 2018

(54) ROTATING AND ADJUSTABLE PIPE FITTING SQUARE WITH FORCE SENSITIVE KEEPERS

(71) Applicant: Jose Ramirez, West Jordan, UT (US)

(72) Inventor: Jose Ramirez, West Jordan, UT (US)

(*) Notice: Subject to any disclaimer, the term of this patent is extended or adjusted under 35 U.S.C. 154(b) by 372 days.

(21) Appl. No.: 15/147,553

(22) Filed: May 5, 2016

(65) Prior Publication Data

US 2017/0210004 A1 Jul. 27, 2017

Related U.S. Application Data

(63) Continuation-in-part of application No. 15/006,023, filed on Jan. 25, 2016, now Pat. No. 10,029,348.

(51) Int. Cl.
| | |
|---|---|
| *B25H 7/00* | (2006.01) |
| *B43L 7/00* | (2006.01) |
| *G01B 3/56* | (2006.01) |
| *B43L 7/027* | (2006.01) |

(52) U.S. Cl.
CPC .............. *B25H 7/005* (2013.01); *B43L 7/027* (2013.01); *G01B 3/566* (2013.01)

(58) Field of Classification Search
CPC .......... B25H 7/005; B43L 7/027; B01B 3/566
USPC .......................................... 33/529, 475, 535
See application file for complete search history.

(56) References Cited

U.S. PATENT DOCUMENTS

| | | | | |
|---|---|---|---|---|
| 2,461,783 A | * | 2/1949 | Stark ................... | B23K 37/0536 269/43 |
| 2,607,126 A | * | 8/1952 | Sekki ..................... | B25H 7/005 33/21.3 |
| 3,153,859 A | * | 10/1964 | Jones ...................... | E04F 21/26 33/419 |
| 3,670,418 A | * | 6/1972 | Hamilton, Jr. ........ | B23K 37/053 33/419 |
| 4,910,876 A | * | 3/1990 | Channell .................. | G01C 9/28 33/194 |
| 4,914,825 A | * | 4/1990 | Howard .................. | G01B 3/566 33/427 |
| 5,933,974 A | * | 8/1999 | Walters ............... | E04G 21/1808 33/392 |
| 6,317,993 B1 | * | 11/2001 | Loyd .................. | B23K 37/0536 33/412 |
| 6,622,395 B1 | * | 9/2003 | Hickey .................. | B25H 7/005 33/452 |

(Continued)

*Primary Examiner* — Christopher Fulton
(74) *Attorney, Agent, or Firm* — Lyman Moulton, Esq.; Moulton Patents, PLLC

(57) ABSTRACT

A squaring device includes a longitudinal square component configured to form a flange defining a slot therein, the slot adapted to rotatably receive a flat stock end. An "L" shaped square component includes a first outside edge and a second outside edge, the first and the second outside edges configured to form a flange defining a slot therein along a length of the flange, the flange adapted to rotatably receive one of the first forty-five degree and the second forty-five degree flat stock ends of the longitudinal square component. A magnetic clip is adjustable to fit either the flange end or the flat stock ends of the longitudinal square and the "L" square components via adjustable linear force sensitive pins, wherein a squaring device is formed and fixed magnetically and mechanically in place for pipe fitting by a combination thereof. Level indicators therein include magnifying lens and lighting.

20 Claims, 5 Drawing Sheets

(56) References Cited

U.S. PATENT DOCUMENTS

| | | | |
|---|---|---|---|
| 6,912,794 B2* | 7/2005 | Hannah | E04G 21/1808 |
| | | | 33/365 |
| 6,931,735 B1* | 8/2005 | Clark | A47H 7/00 |
| | | | 33/194 |
| 7,546,687 B2* | 6/2009 | Haala | B43L 7/027 |
| | | | 33/415 |
| 2015/0191039 A1* | 7/2015 | Johnson | B43L 7/14 |
| | | | 33/427 |

* cited by examiner

ROTATING AND ADJUSTABLE PIPE FITTING SQUARE WITH FORCE SENSITIVE KEEPERS

CROSS-REFERENCE TO RELATED APPLICATION

This application is a CIP (Continuation in Part) of earlier filed U.S. patent application Ser. No. 15/006,023, now U.S. Pat. No. 10,029,348 titled 'Torque Sensitive Adjustable Locking Grinder Guard' filed Jan. 25, 2016 by Jose Ramirez and and claims the benefit of the earlier filing date and is incorporated herein by reference in its entirety.

BACKGROUND OF THE INVENTION

Conventional tools available to a pipe fitter are two dimensional and therefore present problems to three dimensional pipe fitting. For instance, a conventional "L" shaped square may slide off the crest of a pipe where it is put by a fitter during squaring of a fitting to a section of pipe and render a squaring in accurate. Furthermore, the pipe fitter may not even be aware that his square has slide off the pipe crest and rendered his fitting inaccurate.

A small degree of offset in any of three dimensions in a pipe fitting weld can put a destination end of the pipe inches and even feet off a desired target. For this reason alone it is crucial that a pipefitter get as close as possible to a straight weld, an orthogonal weld and an angular weld according to specifications. However, a pipe fitter has limited tools at his disposal to fit and weld a pipe to straight, square and angular specifications.

SUMMARY OF THE INVENTION

A squaring device, comprising a longitudinal square component including a first forty-five degree and an opposing second forty-five degree end, the first end configured to form a flange defining a slot therein along a length of the flange, the slot adapted to rotatably receive a straight edge of another tool or at least one magnet therein and the second end comprising a flat stock end. An "L" shaped square component includes a first outside edge and a second outside edge, the first and the second outside edges configured to form a flange defining a slot therein along a length of the flange, the flange adapted to rotatably receive one of the first forty-five degree and the second forty-five degree end of the longitudinal square component. An included magnetic clip is adjustable to fit either the flange end or the flat stock end of either or both of the longitudinal square and the "L" square components via linear force sensitive pins, wherein a squaring device is formed by a combination of two components chosen from the longitudinal square component, the "L" shaped square component joined by the magnetic clip via a flange slotted end with a flat stock end.

Other aspects and advantages of embodiments of the disclosure will become apparent from the following detailed description, taken in conjunction with the accompanying drawings, illustrated by way of example of the principles of the disclosure herein.

Figure 1:
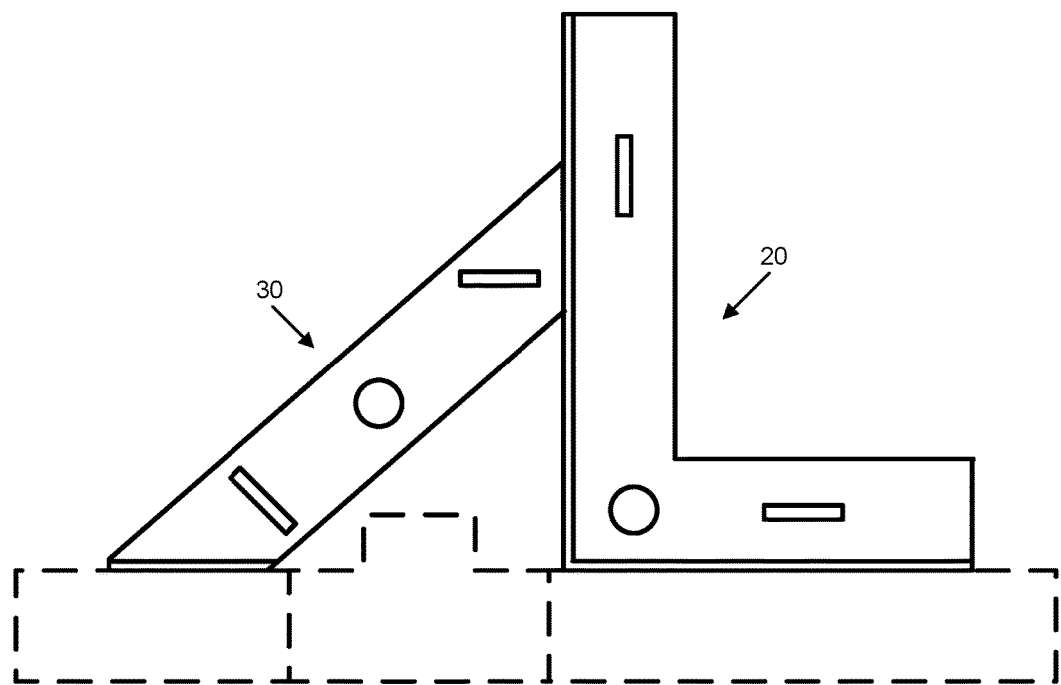
FIG. 1 is a side elevational view of a rotatable and adjustable pipe fitting square in accordance with an embodiment of the present disclosure.

Throughout the description, similar and same reference numbers may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

Throughout the present disclosure, the term "linear force sensitive" refers to the ability of a component of the disclosure to sense the linear force necessary to put the magnetic clip into a locking position relative to the respective square component or both clamped together. Also throughout the present disclosure, the term "adjustable" refers to a adjustable and locking mechanism that allows adjustments to various positions between the magnetic clip and a respective square component via a plurality of linear force sensitive pins. The terms 'pins,' and 'keepers' and the like are considered synonymous in the present disclosure.

FIG. 1 is a side elevational view of a rotatable and adjustable pipe fitting square in accordance with an embodiment of the present disclosure. A squaring device, includes a "L" square component 20, a longitudinal square component 30 and a magnetic clip (not depicted). Broken lines depict a "T" junction in fitted pipe to be squared and welded using the disclosure. The disclosure allows for a square fitting despite the "T" junction making conventional methods and devices inadequate. The combination of the disclosed square devices allows a clearance of the "T" fitting by the square devices. The longitudinal component 30 includes a first forty-five degree and an opposing second forty-five degree end. The first end is configured to form a flange defining a slot therein along a length of the flange, the slot adapted to rotatably receive a straight edge of another tool disclosed herein or at least one magnet therein. The second end has a flat stock end. The "L" shaped square component 20 includes a first outside edge and a second outside edge, the first and the second outside edges are configured to form a flange defining a slot therein along a length of the flange. The flange is adapted to rotatably receive one of the first forty-five degree and the opposing second forty-five degree end of the longitudinal square component. The magnetic clip is adjustable to fit either the flange end or the flat stock end of either or both of the longitudinal square and the "L" square components via torque sensitive pins (depicted in FIG. 6 and FIG. 8). A rotatable and adjustable pipe fitting squaring device is formed by a combination of two components chosen from the longitudinal square component, the "L" shaped square component joined by the magnetic clip via a flange slotted end with a flat stock end.

In another embodiment, a rotatable joinder of the longitudinal square component with the "L" shaped square component via the second flat stock end of the longitudinal squaring component is made. An inside the slot of one of the first and the second outside edges of the "L" shaped squaring component are joinded adjustable along the length of the flange and rotatable about an axis parallel with the length of the flange.

Figure 2:
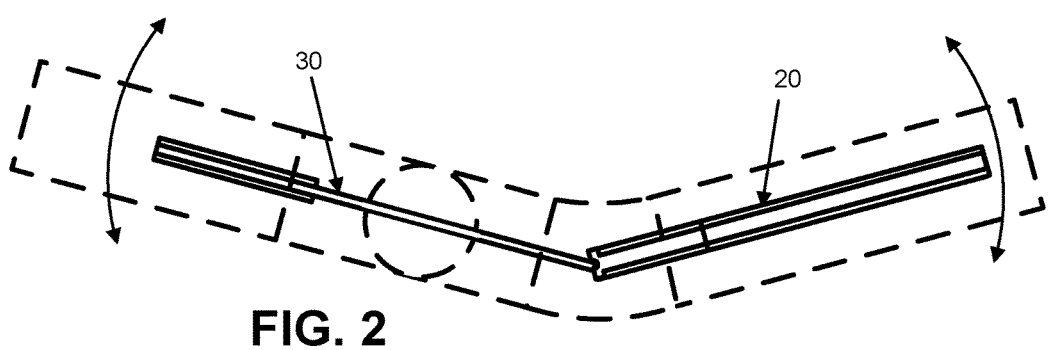
FIG. 2 is a top elevational view of a rotated and adjusted pipe fitting square in accordance with an embodiment of the present disclosure.

FIG. 2 is a top elevational view of a rotated and adjusted pipe fitting square in accordance with an embodiment of the present disclosure. The broken line pipe there beneath has deviated from the straight line fitting of FIG. 1 to include an angle turn but still includes the "T" junction that needs to be cleared in order for the fitting to be welded properly. The rotating juncture of the two square component devices allows the two devices to sit at the crest of the respective section of pipe so that a square weld may be made. The disclosure accommodates other angles including acute angles and acute inside and outside pipe fitted angles.

Figure 3:
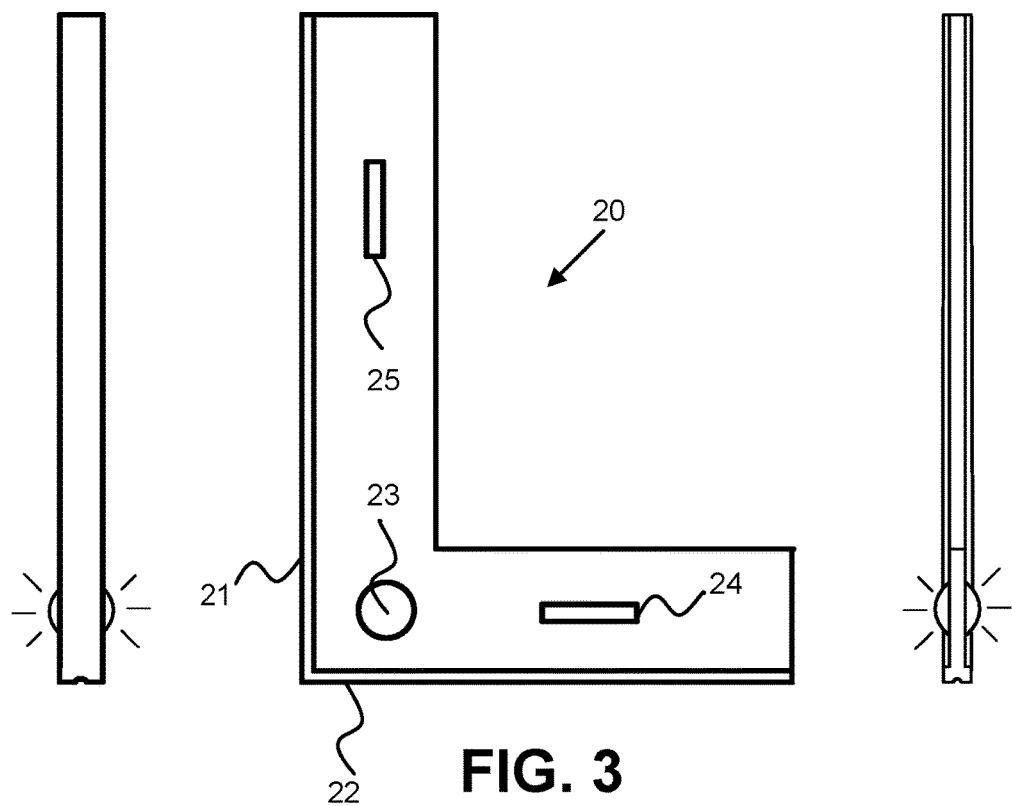
FIG. 3 is a side elevational view with left and right end views of the "L" Square component of the rotatable and adjustable pipe fitting square in accordance with an embodiment of the present disclosure.

FIG. 3 is a side elevational view with left and right end views of the "L" Square component of the rotatable and adjustable pipe fitting square in accordance with an embodiment of the present disclosure. The "L" square component includes a first outside flanged edge 21, a second outside flanged edge 22 and inside edges and flat stock edges. The "L" square edge also includes three level indicators 23, 24 and 25. Level indicator 23 is a dual convex magnified rotatable level indicator which allows a user to dial in a certain angular position of the level and may be lit electronically or via luminescence. A single convex magnified implementation is also included in embodiments. Level indicator 24 determines parallel edges to the outside flanged edge 22 and likewise level indicator 25 depicts parallel edges to the outside flanged edge 21. The angularly adjustable level indicator in each of the components is aligned in a same plane as one flat stock edge of the respective squaring component. At least one fixed level indicator in each of the squaring components is aligned one of orthogonally and parallel to a straight edge of the respective squaring component as depicted. At least one level indicia or supporting device is set within or adjacent to each of the squaring components, the indicia configured to magnify and luminesce via a lens and an active light and a passive light.

Figure 4:
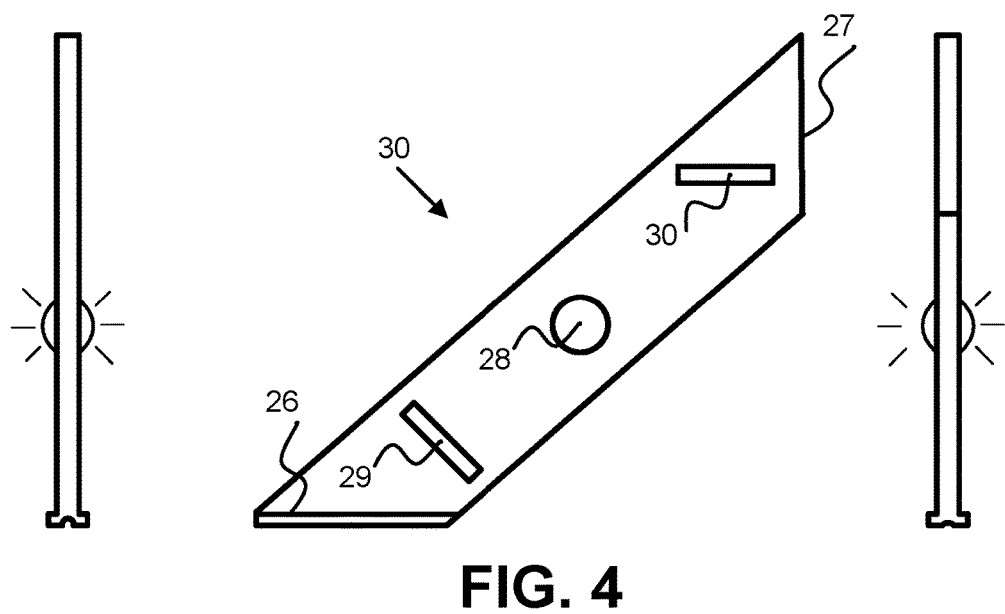
FIG. 4 is a side elevational view with left and right end views of the longitudinal square component of the rotatable and adjustable pipe fitting square in accordance with an embodiment of the present disclosure.

FIG. 4 is a side elevational view with left and right end views of the longitudinal square component of the rotatable and adjustable pipe fitting square in accordance with an embodiment of the present disclosure. Component features are same and similar to those of the "L" square component including level indicators 28, 29 and 30. Level indicator 28 is a dual convex magnified rotatable level indicator similar to indicator 23 and may be lit electronically or via luminescence. A single convex magnified implementation is also included in embodiments. The first end 26 is flanged while the second end 27 is a flat stock end and un-flanged. Embodiments are also included having flat stock ends at both the first end 26 and the second end 27 for independent use of the longitudinal square component. Embodiments are further included with flanged ends at both the first end 26 and the second end 27 for independent use. Both the double flanged and the double flat stock ended embodiments include cutouts to accommodate a hand grip and to lighten an overall weight thereof. The longitudinal square component is also fabricated of varying sizes to accommodate a single hand held cutout and multiple hand held cutouts and other weight reduction cutouts of various geometries. The forty-five degree flat stock edges also comprise embedded magnets configured to attach the longitudinal square component to fitted steel pipe both before and during welding. However, the second end may be fitted with the magnetic clip to comprise a flanged end as further disclosed and depicted herein. Supporting magnifying and illuminating indicia or devices are also included in this embodiment. Magnifying lens may be either a bubble type or a flat type depending on cost and manufacturing constraints.

Figure 5:
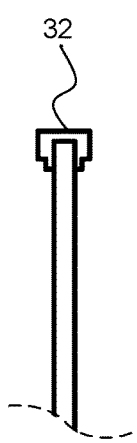
FIG. 5 is a split elevational edge view of an "L" square component of the rotatable and adjustable pipe fitting square depicted with the magnetic clip adjusted to a flanging and a flat stock end in accordance with an embodiment of the present disclosure.

FIG. 5 is an elevational edge view of an "L" square component of the rotatable and adjustable pipe fitting square depicted with the magnetic clip adjusted to a flanging and a flat stock end in accordance with an embodiment of the present disclosure. This embodiment depicts only a single flanged outside edge 31 which has a magnetic clip slid thereon. The flat stock end 32 is also fitted with a flanging magnetic clip though of a different collar as depicted in closer detail in the following FIG. 6 below.

Figure 6:
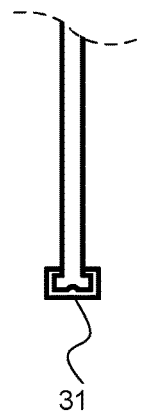
FIG. 6 is a close up split view of FIG. 5 depicting retaining pins in respective magnetic clips configured to fix the clips to a flanging and a flat stock end in accordance with an embodiment of the present disclosure.
Figure 6:
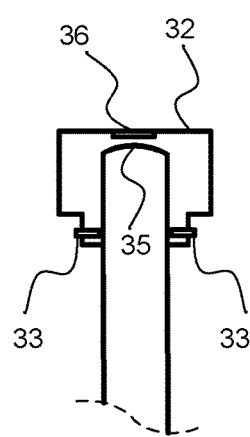

FIG. 6 is a close up split view of FIG. 5 depicting retaining pins in respective magnetic clips configured to fix the clips to a flanging and a flat stock end in accordance with an embodiment of the present disclosure. The retaining pins 33 are sensitive to a force or a torque allowing a user to slide the magnetic clip onto a square device ratcheting through adjustable positions relative to the square device without the need to tighten set screws or manually adjust other fasteners. The pins or protrusions of magnetic clip 31 frictionally adhere to the flange of edge 34. The pins or protrusions of magnetic clip 32 frictionally adhere to the sidewall of the flat stock of the square proximal end edge 35.

Figure 7:
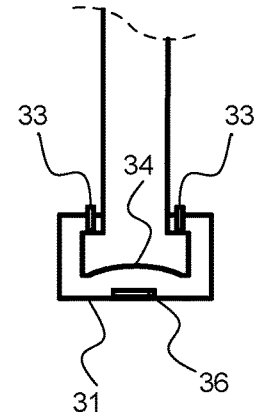
FIG. 7 is a top elevational view and a side elevational view directly below the top elevational view of a rotational bubble level depicted in other figures in accordance with an embodiment of the present disclosure.
Figure 7:
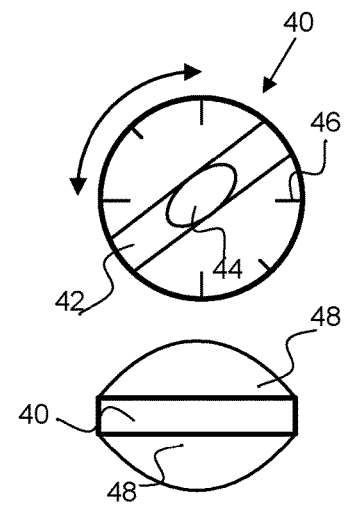
Figure 7:
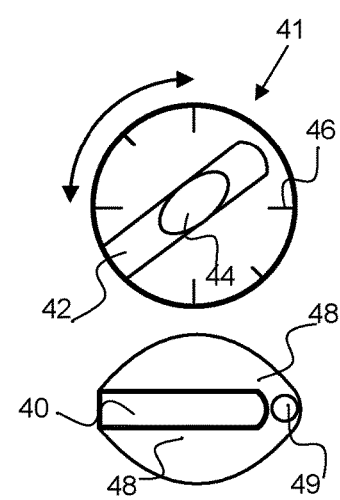

FIG. 7 is a top elevational view and a side elevational view directly below the top elevational view of a rotational bubble level depicted in other figures in accordance with an embodiment of the present disclosure. At least one rotatable level indicator 40 is included in each of the squaring components corresponding to reference numbers 23 and 28 in other drawings herein, specifically FIGS. 3 and 4. The rotatable level indicator 40 is rotatable within a respective squaring component to be aligned to any angle with a straight edge of the respective squaring component. The vial 42 contains the bubble 44 for indicating relative leveling of the vial with its surroundings. The marking indicia 46 and corresponding marking on a respective square component allow a user to sync up an angle for a level of the respective component. The indicia may include 0, 15, 30, 45, 60, 75 and 90 degree markings etc around a complete circumference of the rotatable level indicator. A dual convex magnifying lens 48 is also depicted but a non-convex magnifying lens may be used to such as a Frenel lens. Single convex magnifying lenses may also be included in embodiments. Any of the indicators may be lit electronically (embedded light emitting diode LED) or via luminescence. Electronic leveling components may also be included in the rotatable level indicator replacing or augmenting the bubble level vial. The rotatable level indicator 41 includes a bubble level centrally inserted in a spherical magnifying lens. Also, the lighting via an LED component embedded therein or inserted through an opening 49 in a body of the lens is included in embodiments. Another embodied clip is configured for a square without flanging edges and therefore includes tabs or keepers to make a mechanical fit of the clip onto the square. The embodied clip is thus slid from an end of the square onto an arm of the square up to and including a joint of the square formed between the two arms of the square. The embodied clip also includes notches on a bottom side thereof distal from an inside of the two arms. The notches are typically 0.5 inches in width and include three equally spaced along an 11 inch clip. The notches allow viewing of indicia on the square there through the clip. The clip measures a nominal 0.625 inches in width assembled over a square 0.125 inches flat stock. A side elevational view therefore appears crenelated on both clip sides and a top and bottom view appear banded.

Figure 8:
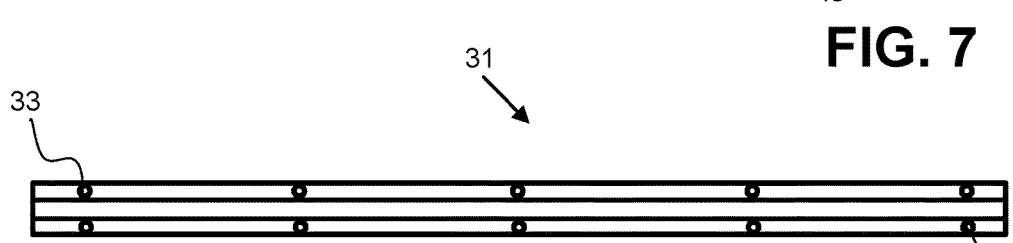
FIG. 8 is a longitudinal top elevational view of the magnetic clip in accordance with an embodiment of the present disclosure.

FIG. 8 is a longitudinal top elevational view of the magnetic clip in accordance with an embodiment of the present disclosure. The view depicts the linear force sensitive pins 33 spaced along a length of the magnetic clip 31 in the collars thereof. The pins therefore apply a force orthogonal to a back surface of the flange of the respective square device. The linear force that the pins are configured to be sensitive to is the force applied by a user in sliding the clip into position on a flange or an edge of the square device. The magnetic clip 32 also has pins spaced along a length of the collars thereof except the collars are parallel with the flat stock surface of the respective square device and the pins therefore are applying a force perpendicular to the flat stock surface thereof.

Figure 9:
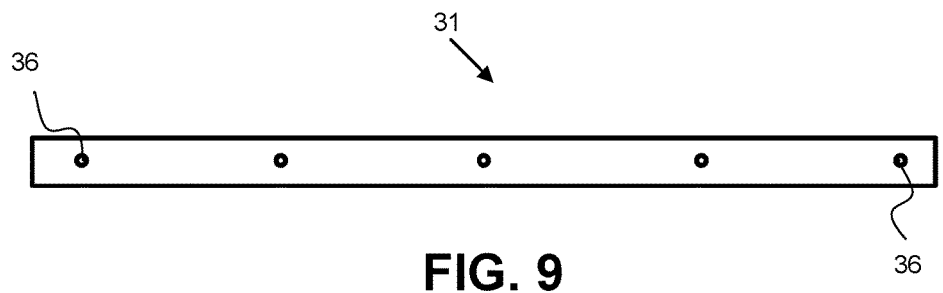
FIG. 9 is a longitudinal bottom elevational view of the magnetic clip in accordance with an embodiment of the present disclosure.

FIG. 9 is a longitudinal bottom elevational view of the magnetic clip in accordance with an embodiment of the present disclosure. The view depicts magnets 36 embedded in the bottom side of the magnetic clip which attract the magnetic clip to a crest of a steel pipe for square fitting of component sections and junctions. The magnets 36 may be disc-like, bar type, and any other shape and of any number including a continuous strip of magnetic material embedded in the bottom side of the magnetic clip. The magnetic clip itself may also be magnetized and preclude the need for embedded magnets.

Figure 10:
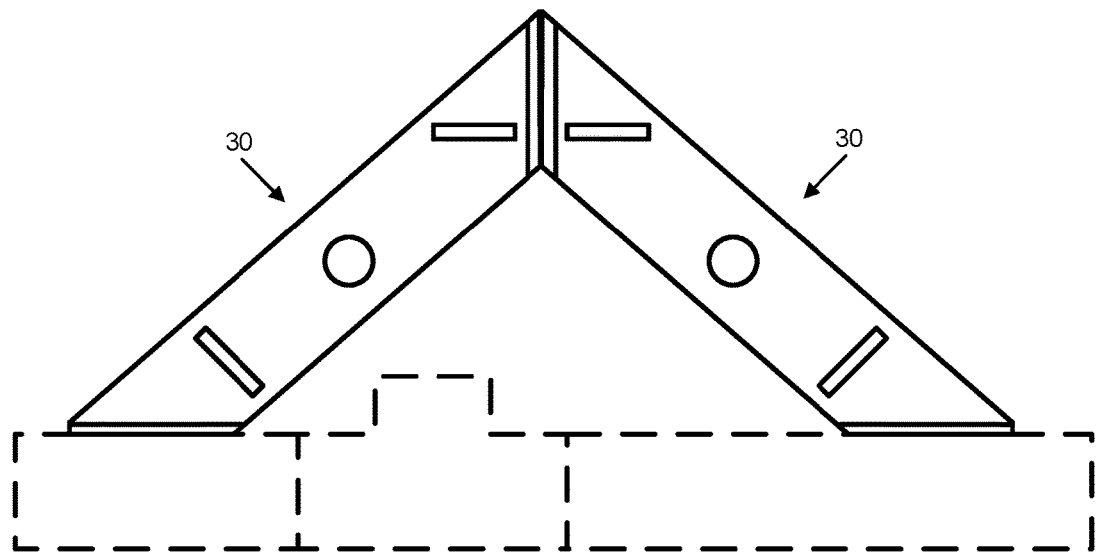
FIG. 10 is a side elevational view of two longitudinal square components of a rotatable and adjustable pipe fitting square in accordance with an embodiment of the present disclosure.

FIG. 10 is a side elevational view of two longitudinal square components of a rotatable and adjustable pipe fitting square in accordance with an embodiment of the present disclosure. A rotatable joinder of the longitudinal square component with another longitudinal square component via the second flat stock end of one longitudinal square component inside the slot of the first end of the other longitudinal square component, the joinder adjustable along the length of the flange and rotatable about an axis parallel with the length of the flange.

At least one magnet received in the flange slot comprises a slotted magnet or a plurality of slotted and segmented magnets. The magnetic clip comprises a plurality of magnets consecutively adjustable within the length of the slot to avoid a north-south magnetic polarity conflict with the magnets of the other disclosed component. Also, the magnetic clip comprises a plurality of linear force sensitive and adjustable pins adapted to engage with either of the flange or the flat stock end of either of the square components and fix the magnetic clip in a pre-determinable relation thereto.

Therefore, the flange slot comprises chamfered edges configured to allow a flat stock edge inserted therein to rotate about a ninety degree angle with respect to an axis of rotation along the length of the slot. A squaring device may therefore be formed by a rotatable combination of two longitudinal square components via joining a flange slotted end with a flat stock end in an embodiment.

Figure 11:
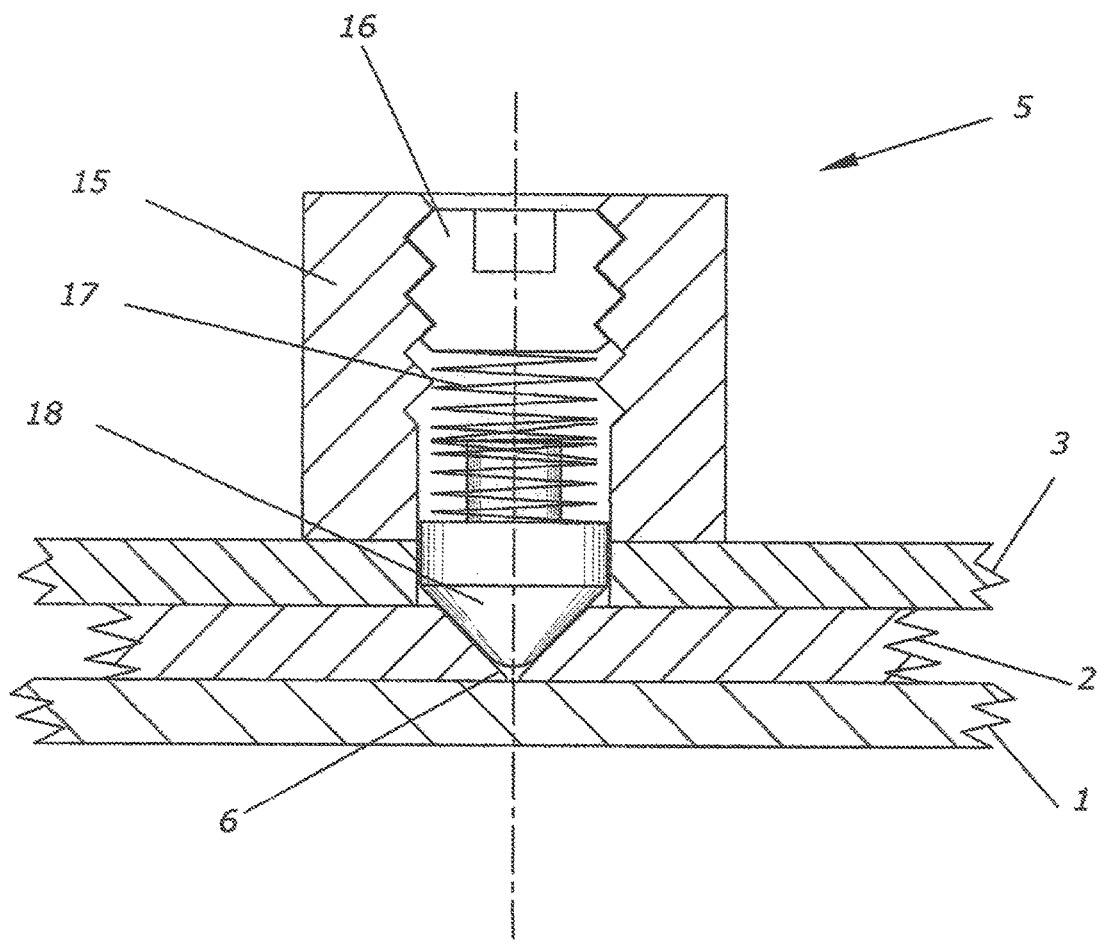
FIG. 11 is a cross sectional view of a retaining pin of a magnetic clip of a rotatable and adjustable pipe fitting square in accordance with an embodiment of the present disclosure.

In an embodiment of the disclosure, pipe fitting jobs not requiring clearance of a "T" joint or similar juncture or member above a profile of a liner pipe string may benefit from a squaring device formed by a rotatable combination of two "L" shaped square components via joining a flange slotted end with a flat stock end. Similar supporting components comprising at least one angularly adjustable level indicator in each of the components aligned in a same plane as one flat stock edge of the component are included as well. Also, the flange slot comprises chamfered edges configured to allow a flat stock edge of another component inserted therein to rotate about a ninety degree angle with respect to an axis of rotation along the length of the slot FIG. 11 is a cross sectional view of a retaining pin of a magnetic clip of a rotatable and adjustable pipe fitting square in accordance with an embodiment of the present disclosure. This embodiment of the disclosed rotatable and adjustable square device includes linear force sensitive keepers or pins with a static frictional load against chamfered holes of the respective square component. The depiction of the disclosed force sensitive design 5, includes layers of a square component 1, 2 and 3 and a chamfered recess or hole therein 6 for receiving the pin 18. A spring 17 is adjusted to a spring tension equal to a linear force necessary to slide the magnetic clip along an edge of the respective square component. A body 15 for retaining the pin 18 is included in embodiments of the disclosure where a helical adjustment of the spring tension is facilitated through a helical recess and a helical screw fitted therein.

The static frictional load is less than a torque applied to the magnetic clip a locked position relative to the square component. Additionally, or in the alternative, the linear force sensitive keepers comprise a spring loaded pin having a spring load less than a linear force applied to the magnetic clip relative to the respective square device to urge a pin out from a locked position in the chamfered recess or hole thereof.

The chamfered holes 6 are configured to receive a conical shaped pin in a semi-temporary locking relation against movement in the same plane. The pins, keepers or protrusions are configured to lock with the chamfered holes 6 of the square component and retract therefrom based on a force applied by a user thereon.

Embodiments are included wherein the plurality of linear sensitive pins and supporting structures thereof including various embodiments where the chamfered recesses or holes 6 are defined equidistantly along a flange of a square device or along a flat stock edge thereof. However, as few as one and any number of pins and corresponding chamfered holes or adjustable keepers are also included in an embodiment of the present disclosure.

In an additional embodiment of the disclosure, the linear force necessary to move a keeper, protrusion, pin or bump from a chamfered hole of the respective square component comprises a nominal 10 ft-lbs to 15 ft-lbs force. This linear force is usually provided by the operator or user in order to adjust the clip to a position relative to the square that provides him or her, the best pipe fit at a crest of the pipe. The force necessary to dial in or adjust the clip into a locked position may be based on a helical adjustment of the pin penetration relative to a chamfered hole in the respective square component. The helical adjustment may be via an adjusting plug or screw which puts pressure directly or indirectly on a pin spring. Additionally, the helical adjustment of a spring coil length acting on the pin relative to a chamfered hole varies the linear force on the magnetic clip or the square component in a sliding adjustment.

Disclosed in another embodiment of the present disclosure, the linear force sensitive pins referred comprise a spring loaded cone 18 or pin having a spring load less than a force applied to the magnetic clip. Yet still, the force sensitive pins comprise a spring loaded ball bearing having a spring load less than a torque applied to the magnetic clip relative to the square component to change a locked position thereto.

The linear force is sufficient to urge the cone pin 18 to retract from the chamfered hole. The torque sensitive spring supplies enough counter force to the movement of the cone pin to offset the retracting motion and allow the cone pin to lock into subsequent index chamfered hole based on the operator. Therefore, the static friction between the cone pin and the chamfered hole is overcome by the linear force applied thereto but is subsequently itself overcome by the spring force or spring constant of the torque sensitive spring. This interplay of forces allows a new locking formation in a subsequent chamfered hole chosen by the operator applying the sliding linear force.

The spring force enables a dialing and locking motion to occur over and over again. However, the spring constant of the torque sensitive spring is not greater than the force resulting in retracting the cone pin from the chamfered hole. A ball bearing implementation may draw spring force from a torque sensitive spring between the ball bearing in the chamfered hole and the helical plug.

The non-obvious and novel features and advantages of the present disclosure are not limited to the applications disclosed herein. Other pipe fitting applications requiring more complex piping and squaring configurations are implicitly included. The rotatable and adjustable pipe fitting square disclosed magnetically adheres to a crest of the pipes to be fitted and therefore provides the most accurate measurements to the pipe fitter. Magnets of varying strengths also allow the disclosure to sit atop a section of pipe unsupported by a user's hands etc so the pipe fitter is able to weld without removing the disclosed square device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents included herein or by reference to a related application.

What is claimed is:

1. A squaring device, comprising:
    a longitudinal square component comprising a first forty-five degree and a second forty-five degree opposing end, the first end configured to form a flange defining a slot therein along a length of the flange, the slot adapted to rotatably receive a straight edge of another tool or at least one magnet therein and the second end comprising a flat stock end; and
    an "L" shaped square component comprising a first outside edge and a second outside edge, the first and the second outside edges configured to form a flange defining a slot therein along a length of the flange, the flange adapted to rotatably receive one of the first forty-five degree and the second forty-five degree end of the longitudinal square component; and
    a magnetic clip adjustable to fit either the flange end or the flat stock end of either or both of the longitudinal square and the "L" square components, wherein
    a squaring device is formed by a combination of two components chosen from the longitudinal square component, the "L" shaped square component joined by the magnetic clip via a flange slotted end with a flat stock end.

2. The squaring device of claim 1, comprising a rotatable joinder of the longitudinal square component with the "L" shaped square component via the second flat stock end of the longitudinal squaring component inside the slot of one of the first and the second outside edges of the "L" shaped squaring component, the joinder adjustable along the length of the flange and rotatable about an axis parallel with the length of the flange.

3. The squaring device of claim 1, comprising a rotatable joinder of the longitudinal square component with another longitudinal square component via the second flat stock end of one longitudinal square component inside the slot of the first end of the other longitudinal square component, the joinder adjustable along the length of the flange and rotatable about an axis parallel with the length of the flange.

4. The squaring device of claim 1, wherein the at least one magnet received in the flange slot comprises a slotted magnet or a plurality of slotted and segmented magnets.

5. The squaring device of claim 1, wherein the magnetic clip comprises a plurality of magnets consecutively adjustable within the length of the slot to avoid a north-south magnetic polarity conflict with the magnets of the other component.

6. The squaring device of claim 1, wherein the magnetic clip comprises a plurality of linear force sensitive and adjustable pins adapted to engage with either of the flange or the flat stock end of either of the square components and fix the magnetic clip in a predeterminable relation thereto.

7. The squaring device of claim 1, further comprising at least one angularly adjustable level indicator in each of the components aligned in a same plane as one flat stock edge of the respective squaring component.

8. The squaring device of claim 1, further comprising at least one rotatable level indicator in each of the squaring components, the rotatable level indicator rotatable to be aligned to any angle with a straight edge of the respective squaring component.

9. The squaring device of claim 1, further comprising at least one level indicia set within each of the squaring components, the indicia configured to include a built in magnifying lens for a user thereof.

10. A device for squaring a pipe fitting, the device comprising:
 a longitudinal square component comprising a first forty-five degree and a second forty-five degree opposing end, the first end configured to form a flange defining a slot therein along a length of the flange, the slot adapted to rotatably receive a straight edge of another tool or at least one magnet therein and the second end comprising a flat stock end; and
 a squaring device formed by a rotatable combination of two longitudinal square components via joining a flange slotted end with a flat stock end, wherein the flange slot comprises chamfered edges configured to allow the flat stock edge inserted therein to rotate about a ninety degree angle with respect to an axis of rotation along the length of the slot.

11. The squaring device of claim 1, further comprising a magnetic clip adjustable to fit either the flange end or the flat stock end of the longitudinal square and comprising a plurality of linear force sensitive and adjustable pins adapted to engage with either of the flange or the flat stock end and fix the magnetic clip in a predeterminable relation thereto.

12. The squaring device of claim 1, further comprising at least one angularly adjustable level indicator in each of the components aligned in a same plane as one flat stock edge of the component.

13. The squaring device of claim 1, further comprising at least one fixed level indicator in each of the components, the fixed level indicator aligned one of orthogonally and parallel to a straight edge of the respective component.

14. The squaring device of claim 1, further comprising at least one level indicia set within each of the components, an area of the indicia configured to emit light via an active light and a luminescence.

15. The squaring device of claim 1, wherein the flange slot comprises chamfered edges configured to allow a flat stock edge inserted therein to rotate about a ninety degree angle with respect to an axis of rotation along the length of the slot.

16. A device for squaring a pipe fitting, the device comprising:
 an "L" shaped square component comprising a first outside edge configured to form a flange defining a slot therein along a length of the flange, the slot adapted to rotatably receive a straight edge of another tool or at least one magnet therein and the second edge comprising a flat stock end; and
 a squaring device formed by a rotatable combination of two "L" shaped square components via joining a flange slotted end with a flat stock end.

17. The squaring device of claim 1, further comprising at least one angularly adjustable level indicator in each of the components aligned in a same plane as one flat stock edge of the component.

18. The squaring device of claim 1, further comprising at least one fixed level indicator in each of the components, the fixed level indicator aligned one of orthogonally and parallel to a straight edge of the component.

19. The squaring device of claim 1, further comprising a magnetic clip adjustable to fit either the flange end or the flat stock end of the "L" square and comprising a plurality of linear force sensitive and adjustable pins adapted to engage with either of the flange or the flat stock end and fix the magnetic clip in a pre-determinable relation thereto.

20. The squaring device of claim 1, wherein the flange slot comprises chamfered edges configured to allow a flat stock edge of another component inserted therein to rotate about a ninety degree angle with respect to an axis of rotation along the length of the slot.

* * * * *